(12) United States Patent
Goel et al.

(10) Patent No.: US 8,042,037 B1
(45) Date of Patent: Oct. 18, 2011

(54) SEQUENCING OF MARKUP LANGUAGE DOCUMENTS

(75) Inventors: Navin Goel, Torrance, CA (US); William D. Compton, Huntington Beach, CA (US); Steven R. Evans, Torrance, CA (US); Randall Ehler, Culver City, CA (US)

(73) Assignee: Glovia International, Inc., El Segundo, CA (US)

( * ) Notice: Subject to any disclaimer, the term of this patent is extended or adjusted under 35 U.S.C. 154(b) by 1994 days.

(21) Appl. No.: 10/977,089

(22) Filed: Oct. 29, 2004

(51) Int. Cl.
*G06F 17/00* (2006.01)

(52) U.S. Cl. ........ 715/234; 715/200; 715/206; 715/221; 715/229; 715/255

(58) Field of Classification Search ............... 715/501.1, 715/505, 506, 530, 200, 206, 221, 229, 234, 715/255
See application file for complete search history.

(56) References Cited

U.S. PATENT DOCUMENTS

| | | | | |
|---|---|---|---|---|
| 5,630,070 | A | 5/1997 | Dietrich et al. | 705/8 |
| 6,141,647 | A | 10/2000 | Meijer et al. | 705/1 |
| 6,438,564 | B1 * | 8/2002 | Morton et al. | 715/206 |
| 6,615,092 | B2 | 9/2003 | Bickley et al. | 700/99 |
| 6,629,008 | B2 | 9/2003 | Shiiba et al. | 700/100 |
| 6,915,275 | B2 | 7/2005 | Banerjee et al. | 705/26 |
| 6,934,594 | B2 | 8/2005 | Loring et al. | 700/100 |
| 7,134,020 | B2 * | 11/2006 | Eagle et al. | 713/176 |
| 7,143,135 | B2 * | 11/2006 | Smith et al. | 709/204 |
| 7,254,585 | B2 * | 8/2007 | Frieden et al. | 1/1 |
| 7,428,707 | B2 * | 9/2008 | Quimby | 715/738 |
| 7,689,899 | B2 * | 3/2010 | Leymaster et al. | 715/224 |
| 2001/0018698 | A1 * | 8/2001 | Uchino et al. | 707/533 |
| 2002/0175950 | A1 * | 11/2002 | Kuiken et al. | 345/785 |
| 2004/0117048 | A1 | 6/2004 | Wei | 700/100 |
| 2004/0117227 | A1 | 6/2004 | Wei | 705/7 |
| 2004/0148212 | A1 | 7/2004 | Wu et al. | 705/8 |
| 2004/0205506 | A1 * | 10/2004 | Clark et al. | 715/501.1 |
| 2004/0236640 | A1 * | 11/2004 | Kassan | 705/27 |
| 2005/0021521 | A1 * | 1/2005 | Wycoff | 707/10 |
| 2005/0108345 | A1 * | 5/2005 | Suzuki | 709/206 |

OTHER PUBLICATIONS

Pembudon et al., XHTML 1.0: The Extensible Hypertext Markup Language, A Reformulation of HTML 4.0 in XML 1.0, W3C Working Draft May 5, 1999 http://www.w3.org/TR/1999/xhtml1-19990505/.*
American Heritage, The American Heritage College Dictionary:, 2002, Houghton Mifflin Company, Fourth Edition, pp. 494 (Total Pages: 4 pp).*
Wacker, J.G., Lummus, R.R., "Sales Forecasting for Strategic Resource Planning," International Journal of Operations & Production Management 22, 9/10 (2002) 1014-1031.

* cited by examiner

*Primary Examiner* — Cesar Paula
*Assistant Examiner* — David Faber
(74) *Attorney, Agent, or Firm* — Baker Botts L.L.P.

(57) ABSTRACT

A communication system includes a number of devices interconnected by a communication network and each operable to communicate with each other using a text-based communication protocol that provides for the exchange of markup language documents. Each of the devices includes a document interface capable of sequencing documents for communication to other devices and for enforcing sequencing of received documents.

25 Claims, 3 Drawing Sheets

SEQUENCING OF MARKUP LANGUAGE DOCUMENTS

TECHNICAL FIELD OF THE INVENTION

The present invention relates generally to sequencing of text documents and, more particularly, to sequencing of markup language documents used for communications.

BACKGROUND OF THE INVENTION

The introduction of the World-Wide-Web gave rise to the popularity of text-based communication formats, such as hypertext markup languages (HTML). A number of other markup languages have evolved to provide even greater functionality than was originally provided by HTML. For example, extensible markup language (XML) provides a generic framework for sophisticated text-based communications. With the rapid spread of these text-based communication protocols, additional technological challenges must constantly be identified and overcome.

SUMMARY OF THE INVENTION

In accordance with the present invention, techniques for sequencing of markup language documents are provided.

According to a particular embodiment, a method for sequencing document-based communications receives a markup language document that includes text-based electronic data for delivery to a destination address. The method determines a thread identifier associated with the document, with the thread identifier indicating that the document is one of potentially multiple related documents. The method determines a sequence indicator for the document based on the thread identifier, modifies the document to indicate the sequence indicator, and stores the thread identifier and associated sequence information in an interface database, with the sequence information determined based on the sequence indicator. The method further transmits the document using a communication network.

Embodiments of the invention provide various technical advantages. These techniques can provide for sequencing of markup language documents. This can help ensure proper processing of these documents at receiving devices. For example, the sequencing of markup language documents may ensure that the receiving device operates on received documents in an appropriate order. Also, according to particular embodiments, specialized markup language interfaces may operate on communicating devices to provide for the sequencing of documents. These specialized interfaces can thus provide transparent sequencing functionality without impacting other applications and elements within a system. That is, other applications and elements need not have an awareness of the sequencing of documents performed by the interfaces. Further, using the document interfaces to enforce document sequencing provides a standardized technique for ensuring document ordering without requiring individual applications to implement complex business logic to overcome transport limitations. However, applications operating with an awareness of the sequencing can communicate markup language documents to remote devices with an assurance that these messages will be processed in an appropriate order.

The sequencing of documents may also provide for enhanced error detection and avoidance. At a receiving device, the sequencing of documents enables the device to avoid processing errors by operating on the documents in the indicated order. Moreover, the receiving device may detect errors by determining when expected documents have not been received.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
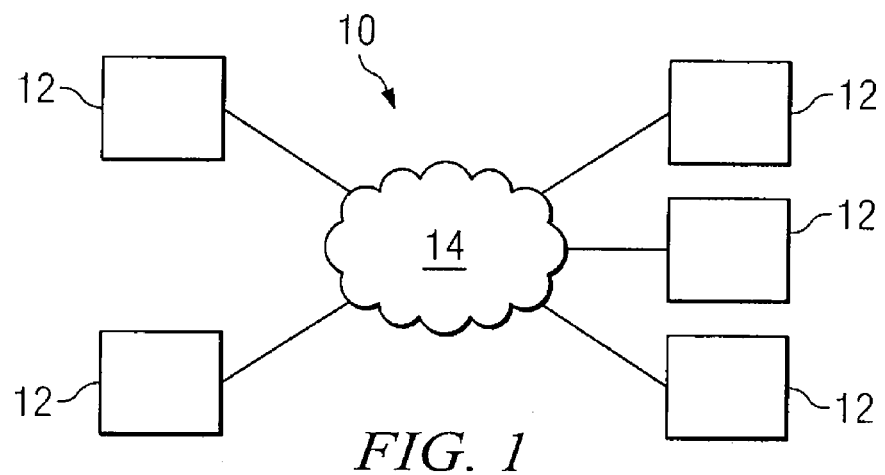
FIG. 1 is a system that includes a network interconnecting a number of devices each operable to process sequencing of markup language documents.

FIG. 1 illustrates a communication system, indicated generally at 10, that includes a number of devices 12 interconnected by a communications network 14. Applications operating on devices 12 communicate with each other using text-based communication protocols that provide for the exchange of documents. During communications, interfaces on devices 12 may provide for the sequencing these documents. This enables an ordering of the documents by the transmitting device 12 and processing of the documents in the appropriate order at the receiving device 12.

For communications, network 14 provides for transport of documents between communicating devices 12. Network 14 represents any suitable collection and arrangement of components capable of interconnecting devices 12. For example, network 14 may encompass some or all of networks such as the Internet, the public switched telephone network (PSTN), and private networks.

Devices 12 represent hardware, including appropriate controlling logic, capable of processing information and interacting with other devices 12 using text-based communications. For example, devices 12 may represent one or more elements of a distributed enterprise system that perform business functions at various locations. Applications on devices 12 interact with each other by exchanging documents containing text-based communications. These documents may conform to any public or private standards designed for text-based communications. For example, these documents may be markup language documents conforming to HTML, XML or other suitable public or private standards. Thus markup language documents should be understood to encompass any suitable text-based communication conforming to a public or private communication protocol.

Within devices 12, document interfaces provide for the sequencing of communicated documents. For transmission, the document interfaces provide for identification of documents for sequencing, determinations of appropriate sequence numbers, modification of the documents to include the sequence numbers, and transmission of the sequenced documents. This sequencing of documents can help enable appropriate handling of the information in the documents.

For example, consider a business application on device 12 placing and then updating an order with a remote application through a series of markup language documents, with the original order specifying five units, the first update requesting an increase of ten units, and a final update reversing the first update by requesting a decrease of ten units. The resulting delivery should be for five units. However, if the two updates are received and processed in reverse order, the resulting delivery will be for ten units—an unexpected and undesired result. Thus the sequencing provided by the transmitting device 12 helps enable the receiving device 12 to correctly handle received documents.

A document interface on the receiving device 12 helps to handle processing of received documents according to an indicated sequence. For this handling, the document interface identifies sequenced documents and ensures delivery to destination applications in the indicated ordering. For this, the document interface forwards documents to the destination application when the correct document in a sequence has been received and stores those documents that are received out of order. Thus the document interface provides a buffer in which out of order documents are maintained until previous documents are received. The document interface at the receiving device 12 may further provide error detection. For example, if the document interface receives an out of order document and then fails to receive the expected next document for some period of time, the document interface may raise an error condition. This can help to ensure retransmission of documents or other appropriate steps to handle the failed delivery of a document.

It should be understood that while system 10 illustrates a relatively simple configuration of devices 12 interconnected by network 14, system 10 is provided merely for illustrative purposes. Thus the disclosed concepts should be understood to encompass any suitable collection and arrangement of components in which endpoints use document sequencing in a manner similar to that described herein.

Figure 2:
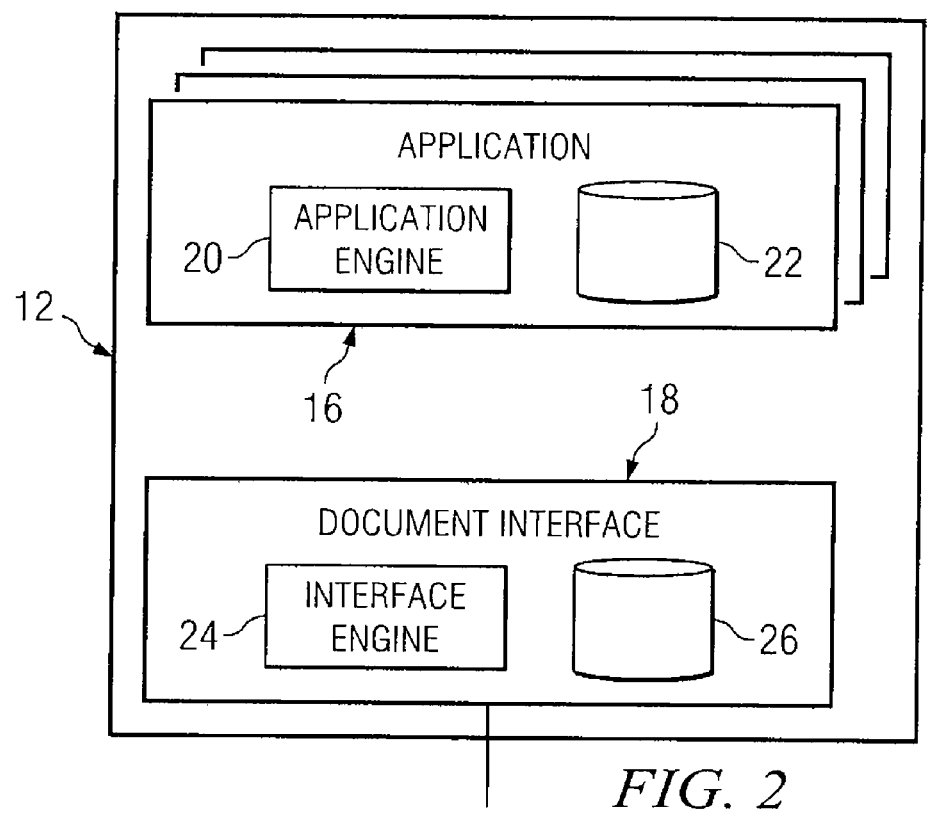
FIG. 2 is a block diagram illustrating exemplary functional elements for a device from the system.

FIG. 2 is a block diagram illustrating exemplary functional elements for a device 12 that includes one or more applications 16 and a document interface 18. Applications 16 provide processing and other high level functionality, and further support communications with other applications and devices 12 using document-based communications. Document interface 18 provides for transport of documents communicated between devices 12. Document interface 18 further provides for sequencing of transmitted documents and enforcement of ordering for received documents.

Each application 16 includes software or other logic capable of generating documents for transmission and for processing received documents. For example, application 16 may be a business application for handling enterprise resource planning activities for a managed facility, with the application capable of communicating with other business applications using text-based document communications. In the embodiment illustrated, application 16 includes an application engine 20, for performing processing functions, and an application database 22, for maintaining data for use by application 16. For example, application database 16 may maintain application logic and business data used by application 16. According to particular embodiments, application 16 may generate sequences of associated documents for delivery to remote applications. Also, applications 16 may perform operations on received sequences of documents. However, without implementing application specific business logic, two communicating applications may not have any mechanism to enforce transport and processing of documents in appropriate order. As an alternative to implementing application specific ordering techniques, document interface 18 provides a standard transport mechanism that supports and enforces document sequencing.

Document interface 18 represents software or other logic for handling transmission and receipt of documents. Document interface 18 supports sequencing of outbound documents and enforcement of indicated ordering for sequenced inbound documents. In the embodiment illustrated, document interface 18 includes an interface engine 24, for performing processing functions, and an interface database 26, for maintaining data used by document interface 18. According to particular embodiments, interface database 26 stores configurations for sequencing of documents, such as message types for which sequencing is appropriate. Interface database 26 may further store information to enable appropriate sequencing, such as data for identifying associated documents and for assigning sequence numbers. Further, interface database 26 may store information for handling of incoming sequenced documents, such as data for identifying associated incoming documents and for enforcing ordering of the documents. In addition, interface database 26 may provide a buffer for storage of sequenced documents that received out of order. Specific examples of data maintained within interface database 26 are provided below with respect for FIG. 3.

As previously noted, applications 16 communicate with remote applications 16 using markup language documents. Thus during operation, an application 16 may generate documents for delivery to a remote application. Moreover, application 16 may generate a group of related documents that have an intended sequence. Application 16 provides these documents to document interface 18 for transmission. Upon receipt of a document from application 16, document interface 18 may determine whether or not the document should be sequenced. For example, document interface 18 may determine a message type of the document and then access configurations within interface database 26. These configurations can indicate types of messages that should be sequenced.

To sequence a document, document interface 18 first determines an appropriate sequence number. If the document is the first of a group, then any suitable initial indicator may be assigned. For subsequent documents, document interface 18 assigned indicators for specifying the position of the document in the group. For example, document interface 18 may assign sequential numbers. This sequencing establishes a thread of documents with a specified ordering that may be enforced by the receiving document interface. To track information related to a thread of documents, document interface 18 may use interface database 26. This permits appropriate identification and sequencing of documents.

Document interface 18 further provides for handling of the received documents that indicate sequencing information. Upon receiving a document, document interface 18 determines whether or not the document indicates sequencing information. For example, document interface 18 may examine particular fields within a received document to determine whether the document indicates sequence information. If so, document interface 18 determines whether the document is the next expected for its associated thread. If the document is the next expected, document interface 18 forwards the document to its intended application 16. If not, document interface 18 may store the document in interface database 26 until all preceding documents in the thread are received. Thus document interface 18 provides a transport level solution to support sequencing of documents and enforce sequenced delivery of documents to applications 16.

In addition, document interface 18 may monitor for errors or otherwise unexpected conditions. For example, as previously discussed, document interface 18 may store received documents in interface database 26 when preceding documents in a thread have yet to be received. Document interface 18 may monitor these stored documents to determine whether expected documents are received within a predetermined period of time. If an expected document is not received within the set period of time, document interface 18 may indicate an exception. For example, for a particular message type, document interface 18 may be configured to raise an error condition if an expected document is not received within a set period of time for that message type. This error detection may result in any suitable actions, such as messages to administrators, requests for retransmission of missing documents, or other appropriate responses.

While the embodiment illustrated and the preceding description focus on a particular embodiment of device 12 that includes specific logical elements, system 10 contemplates devices 12 having any suitable combination and arrangement of elements that support communications using text-based documents that may be sequenced. Therefore, the modules and functionalities described may be separated or combined as appropriate, and some or all of the functionalities of device 12 may be performed by logic encoded in media, such as software and/or programmed logic devices. Furthermore, it should be noted that the embodiment illustrated and preceding description focus primarily on lower level transport functions without specifying in detail the higher level application functions provided by device 12. However, system 10 contemplates using the disclosed transport mechanisms to support any appropriate applications operating within devices 12.

Figure 3:
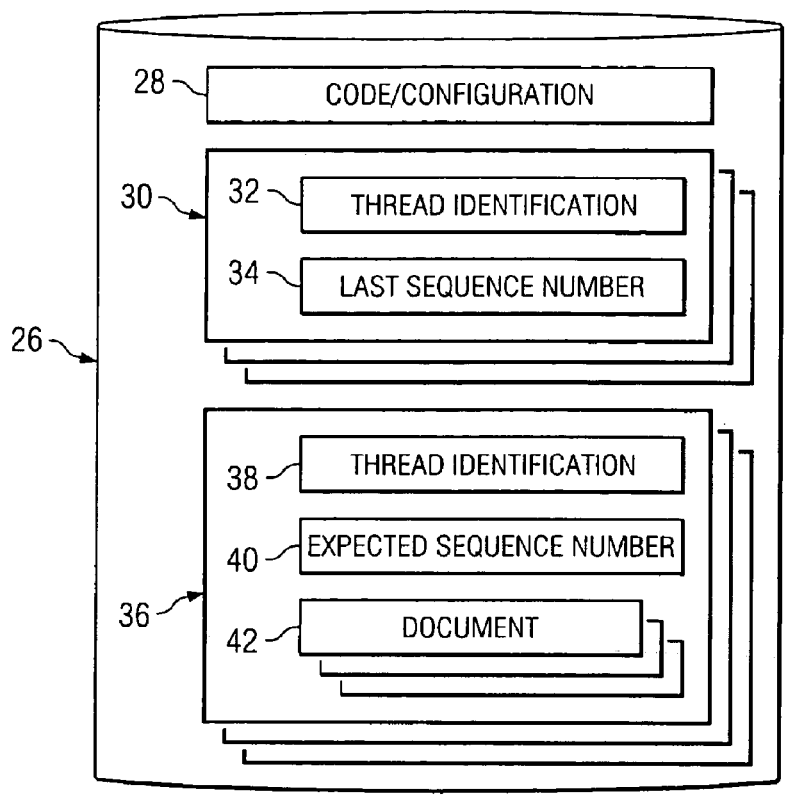
FIG. 3 is a block diagram illustrating in greater detail example information maintained by a document interface of a device from the system.

FIG. 3 is a block diagram illustrating example information maintained by interface database 26, including code and configuration information 28, thread transmission information 30, and thread receive information 36. As discussed above, the information maintained within information database 26 helps document interface 18 to sequence outgoing documents and to enforce ordering of incoming documents.

Code and configuration information 28 includes software or other appropriate logic routines for use in controlling the operation of document interface 18. Code and configuration information 28 further includes configuration information for use during operation of document interface 18. For example, this may include information specifying message types suitable for sequencing, user settings and preferences indicating applications 16 desiring sequencing, and other appropriate configuration data.

Thread transmission information 30 includes information for use in sequencing outbound documents. In the embodiment illustrated, thread transmission information 30 includes any number of individual entries indicating a thread identifier 32 and a last sequence number 34. Thread identifier 32 enables document interface to match associated documents to each other. For example, consider application 16 generating a series of documents related to a common order. Each of these documents may share a common business code identifying the document as a particular sales order. Document interface 18 may thus use thread identifier 32 to track documents corresponding to a common sequence. Last sequence number 34 indicates the last sequence number used for the thread of related documents. Document interface 18 may thus use last sequence number 34 to assign a sequence number for a subsequent document transmitted for the sequence associated with the particular thread identifier 32.

As illustrated, interface database 26 may store any number of entries in thread transmission information 30 corresponding to ongoing threads of documents. Document interface 18 may maintain these entries for any appropriate period of time. For example, document interface can maintain a thread entry for a set period of time after the last transmitted document for the thread. This period of time may depend on the type of message, the corresponding application 16, or any other suitable criteria. Further, the time may fall within any range, such as seconds up to years, depending on the particular requirements of system 10. According to particular embodiments, document interface 18 maintains entries in thread transmission information 30 for configured periods of time according to the message type of the documents in the thread. To support this functionality, interface database 26 may maintain information such as last transmission times for each entry.

To enable enforcement of sequencing in received documents, interface database 26 includes thread receive information 36. In the embodiment illustrated, thread receive information 36 includes a thread identifier 38, an expected sequence number 40, and any number of buffered documents 42. As with thread identifier 32, thread identifier 38 enables document interface 18 to identify documents associated with a particular thread. In the case of thread receive information 36, thread identifier 38 helps to identify information for received documents. Expected sequence number 40 indicates the next sequence number expected for the document thread. For example, if sequence number one was previously received, expected sequence number 40 may indicate that sequence number two is expected. Buffered documents 42 provides storage for out of sequence documents of the thread. Given the previous example, this would include any documents in the thread with a sequence number above two.

Thus the illustrated interface database 26 provides an example of information useful to enable sequencing of documents for transmission and enforcement of sequencing for received documents. However, while the embodiment illustrated and the preceding description interface database 26 focus on particular examples that include specific data elements, system 10 contemplates interface database 26 maintaining any suitable information, using any appropriate combination of hardware and logic, and further using any suitable data storage techniques and formats.

Figure 4:
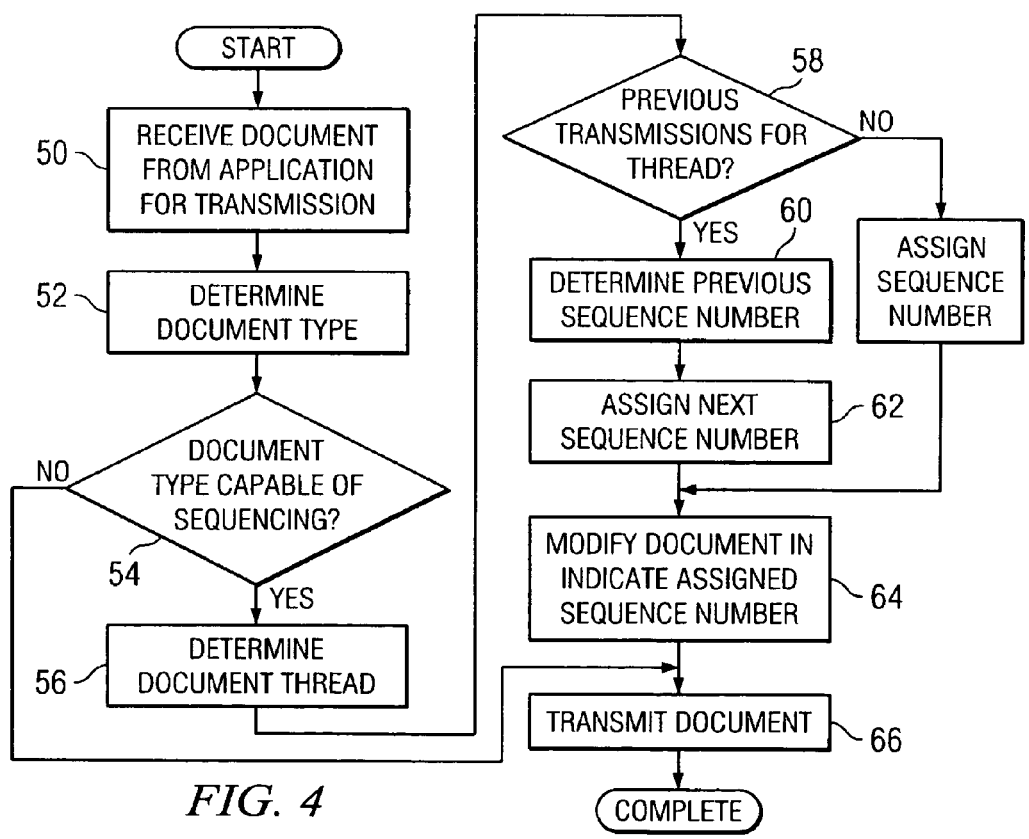
FIG. 4 is a flowchart illustrating an exemplary method for sequencing related documents.

FIG. 4 is a flowchart illustrating a method for sequencing documents for transmission. The following description will focus on the operation of document interface 18, however, it should be understood that similar techniques may be performed by any suitable elements to provide for document sequencing. Document interface 18 receives a document from application 16 for transmission to a destination at step 50. Document interface 18 determines a document or message type at step 52 and determines whether the document type is capable of sequencing at step 54. For example, document interface 18 may access fields in the document to determine a message type and determine whether configuration information in interface database 26 indicates that sequencing is appropriate for the message type. If not, document interface 18 transmits the document at step 66 and then completes processing for that document.

However, if the document type is configured for sequencing, document interface 18 determines the thread associated with the document at step 56 and determines whether there have been previous transmissions for the thread at step 58. For example, document interface 18 may access fields within the document to determine a business identifier and, using the business identifier, may access thread transmission information 30 to determine whether an entry exists for that identifier. If so, document interface determines the previous sequence number at step 60 and then assigns the next sequence number at step 62. In this process, document interface 18 may also update the entry within thread transmission information 30 as appropriate. If the document is the first for a thread, document interface 18 may simply assign an initial sequence number at step 68 and create a new entry in thread transmission information 30 as appropriate. After assigning a sequence number, document interface 18 modifies the document to indicate the assigned sequence number at step 64 and then transmits the document at step 66.

Thus the preceding flowchart illustrates an exemplary method for sequencing a document at the transport level of system 10. However, this flowchart illustrates only an exemplary method of operation, and system 10 contemplates document interface 18 using any suitable techniques, elements, and applications for performing similar sequencing of documents. Thus, many of the steps in this flowchart may take place simultaneously and/or in different orders than as shown. In addition, document interface 18 may use methods with additional steps, fewer steps, and/or different steps, so long as the methods remain appropriate.

Figure 5:
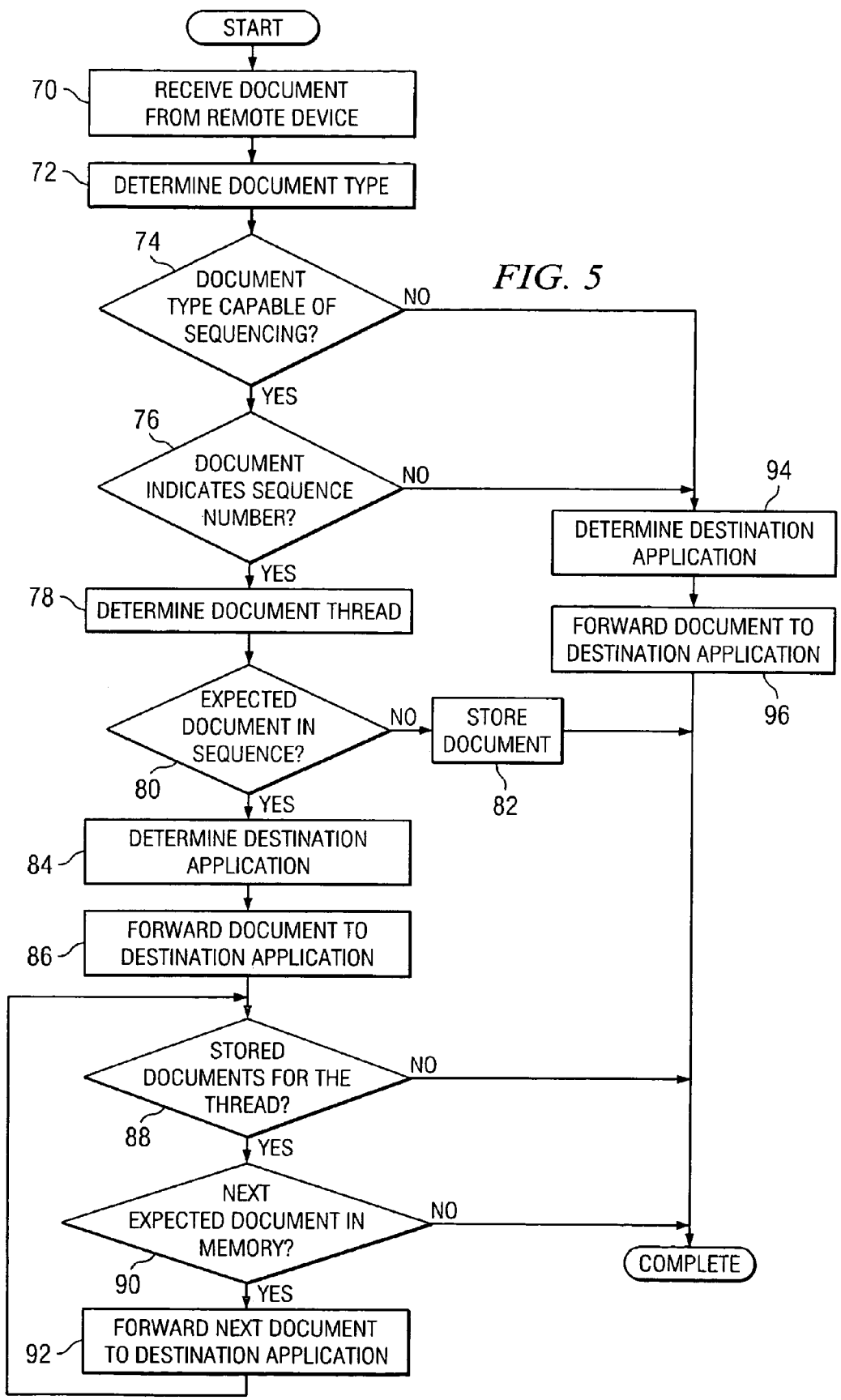
FIG. 5 is a flowchart illustrating an exemplary method for handling receipt of sequenced documents.

FIG. 5 is a flowchart illustrating a method for enforcing sequencing of received documents. The following description will focus on the operation of document interface 18, however, it should be understood that similar techniques may be performed by any suitable elements to provide for enforcement of document sequencing. Document interface 18 receives a document from a remote device 12 at step 70. For example, document interface may receive a document transmitted across network 14. Document interface 18 determines a document or message type at step 72 and determines whether the document type is capable of sequencing at step 74. For example, document interface 18 may access fields in the document to determine a message type and determine whether configuration information in interface database 26 indicates that sequencing is appropriate for the message type. If so, document interface 18 determines if the document indicates a sequence number at step 76. For example, document interface 18 may read a field within the document to determine a sequence number. If the document fails to indicate a sequence number or is otherwise not capable of sequencing, document interface 18 determines a destination application for the document at step 94 and then forwards the document to the destination at step 96.

However, if the document indicates a sequence number, document interface determines the document thread associated with the document at step 78 and whether the document is the expected document for the thread at step 80. For example, document interface may access a field in the document to determine a business identifier and then, using the business identifier, access thread receive information 36 to determine the expected sequence number. If the document is not the next expected, document interface 18 stores the document at step 82 and then completes processing for the document.

If the document is the expected sequence number, document interface 18 determines a destination application for the document at step 84 and then forwards the document to the destination at step 86. Document interface 18 may then determine whether additional expected documents for the thread have previously been received at step 88. If so, document interface 18 determines whether the next expected document in the thread is in memory at step 90. For example, document interface 18 may access buffered documents 42 in thread receive information 36. If the next expected document is in memory, document interface 18 forwards that document to the destination at step 92. Document interface 18 may repeat this process until all expected buffered documents 42 have been forwarded, or until document interface determines that the next expected document has yet to be received.

Thus the preceding flowchart illustrates an example method for enforcing document sequencing at a receiving document interface 18. However, as with the previous flowchart, this flowchart illustrates only an exemplary method of operation, and system 10 contemplates document interface 18 using any suitable techniques, elements, and applications for performing similar sequencing techniques. Thus, many of the steps in this flowchart may take place simultaneously and/or in different orders than as shown. In addition, document interface 18 may use methods with additional steps, fewer steps, and/or different steps, so long as the methods remain appropriate.

Although the present invention has been described in several embodiments, a myriad of changes and modifications may be suggested to one skilled in the art. It is intended that the present invention encompass such changes and modifications as fall within the scope of the present appended claims.

What is claimed is:

1. A method for sequencing document-based communications comprising:
    receiving a markup language document comprising text-based electronic data for delivery to a destination address;
    determining a thread identifier associated with the document, the thread identifier indicating that the document is one of potentially multiple related documents;
    determining a sequence indicator for the document based on the thread identifier;
    modifying the document to indicate the sequence indicator;
    storing the thread identifier and associated sequence information in an interface database, the sequence information determined based on the sequence indicator; and
    transmitting the document using a communication network.

2. The method of claim 1, further comprising:
    receiving a second markup language document;
    determining that the second document indicates the thread identifier;
    determining a second sequence indicator for the document based on the thread identifier and the associated sequence information, the second sequence indicator indicating an ordering of the second document with respect to related documents;
    modifying the second document to indicate the second sequence indicator;
    updating the thread identifier and the associated sequence information; and
    transmitting the second document using the communication network.

3. The method of claim 1, further comprising:
    receiving an inbound document comprising an inbound thread identifier, an inbound sequence indicator, and a destination application address;
    accessing the inbound thread identifier, the inbound thread identifier indicating that the inbound document is one of potentially multiple related documents;
    accessing the inbound sequence indicator;
    determining an expected value for the inbound sequence indicator;

determining whether the sequence indicator matches to the expected value; and if the sequence indicator matches to the expected value, updating the expected value and forwarding the inbound document to a destination application indicated by the destination application address.

4. The method of claim 3, wherein determining the expected value comprises accessing a database using the inbound thread identifier to determine expected sequence information that specifies the expected value.

5. The method of claim 1, wherein the document conforms to a public standard for text-based, markup language communications.

6. The method of claim 5, wherein the standard is an extensible mark-up language (XML) standard.

7. The method of claim 1, further comprising:

periodically accessing a database maintaining a plurality of outbound thread entries, each outbound thread entry specifying an associated identifier, indicating a next sequence indicator, and indicating a period since last transmission; and for each of the outbound thread entries, determining a message type based on the associated identifier and, based on the message type, determining whether the period since the last transmission time exceeds a threshold, and, if the period since the last transmission exceeds the threshold, deleting the outbound thread entry.

8. The method of claim 1, further comprising:

periodically accessing a database maintaining a plurality of inbound thread entries, each inbound thread entry specifying an associated identifier, indicating an expected sequence indicator, indicating a period since a last received document, and indicating whether an unexpected document has been received; and for each of the inbound thread entries, if an unexpected document has been received and if the period since the last received document exceeds a threshold, raising an exception condition.

9. A processing device capable of text-based communications comprising:

an application operable to generate a markup language document comprising text-based electronic data for delivery to a destination address and a thread identifier indicating that the document is one of potentially multiple related documents; and a document interface coupled to the application and to a communication network, the document interface operable to receive the document from the application, to determine the thread identifier, to determine a sequence indicator for the document based on the thread identifier, to modify the document to indicate the sequence indicator, and to store the thread identifier and associated sequence information in an interface database, the sequence information determined based on the sequence indicator, the document interface further operable to transmit the document using the communication network.

10. The device of claim 9, wherein the document interface is further operable to:

receive a second markup language document;

determine that the second document indicates the thread identifier;

determine a second sequence indicator for the document based on the thread identifier and the associated sequence information, the second sequence indicator indicating an ordering of the second document with respect to related documents;

modify the second document to indicate the second sequence indicator;

update the thread identifier and the associated sequence information; and transmit the second document using the communication network.

11. The device of claim 9, wherein the document interface is further operable to:

receive an inbound document comprising an inbound thread identifier, an inbound sequence indicator, and a destination application address;

access the inbound thread identifier, the inbound thread identifier indicating that the inbound document is one of potentially multiple related documents;

access the inbound sequence indicator;

determine an expected value for the inbound sequence indicator;

determine whether the sequence indicator matches to the expected value; and if the sequence indicator matches to the expected value, update the expected value and forward the inbound document to a destination application indicated by the destination application address.

12. The device of claim 11, wherein the document interface is further operable to determine the expected value by accessing a database using the inbound thread identifier to determine expected sequence information that specifies the expected value.

13. The device of claim 9, wherein the document conforms to a public standard for text-based, markup language communications.

14. The device of claim 13, wherein the standard is an extensible mark-up language (XML) standard.

15. The device of claim 9, wherein the document interface is further operable to:

periodically access a database maintaining a plurality of outbound thread entries, each outbound thread entry specifying an associated identifier, indicating a next sequence indicator, and indicating a period since last transmission; and for each of the outbound thread entries, determine a message type based on the associated identifier and, based on the message type, determine whether the period since the last transmission time exceeds a threshold, and, if the period since the last transmission exceeds the threshold, delete the outbound thread entry.

16. The device of claim 9, wherein the document interface is further operable to:

periodically access a database maintaining a plurality of inbound thread entries, each inbound thread entry specifying an associated identifier, indicating an expected sequence indicator, indicating a period since a last received document, and indicating whether an unexpected document has been received; and for each of the inbound thread entries, if an unexpected document has been received and if the period since the last received document exceeds a threshold, raise an exception condition.

17. Computer executable instructions for sequencing document-based communications, the computer executable instructions encoded in computer readable media and operable when executed to perform the steps of:

receiving a markup language document comprising text-based electronic data for delivery to a destination address;

determining a thread identifier associated with the document, the thread identifier indicating that the document is one of potentially multiple related documents;

determining a sequence indicator for the document based on the thread identifier;

modifying the document to indicate the sequence indicator;

storing the thread identifier and associated sequence information in an interface database, the sequence information determined based on the sequence indicator; and transmitting the document using a communication network.

18. The computer executable instructions of claim 17, further operable when executed to perform the steps of:

receiving a second markup language document;

determining that the second document indicates the thread identifier;

determining a second sequence indicator for the document based on the thread identifier and the associated sequence information, the second sequence indicator indicating an ordering of the second document with respect to related documents;

modifying the second document to indicate the second sequence indicator;

updating the thread identifier and the associated sequence information; and transmitting the second document using the communication network.

19. The computer executable instructions of claim 17, further operable when executed to perform the steps of:

receiving an inbound document comprising an inbound thread identifier, an inbound sequence indicator, and a destination application address;

accessing the inbound thread identifier, the inbound thread identifier indicating that the inbound document is one of potentially multiple related documents;

accessing the inbound sequence indicator;

determining an expected value for the inbound sequence indicator;

determining whether the sequence indicator matches to the expected value; and if the sequence indicator matches to the expected value, updating the expected value and forwarding the inbound document to a destination application indicated by the destination application address.

20. The computer executable instructions of claim 19, wherein determining the expected value comprises accessing a database using the inbound thread identifier to determine expected sequence information that specifies the expected value.

21. The computer executable instructions of claim 17, wherein the document conforms to a public standard for text-based, markup language communications.

22. The computer executable instructions of claim 21, wherein the standard is an extensible mark-up language (XML) standard.

23. The computer executable instructions of claim 17, further operable when executed to perform the steps of:

periodically accessing a database maintaining a plurality of outbound thread entries, each outbound thread entry specifying an associated identifier, indicating a next sequence indicator, and indicating a period since last transmission; and for each of the outbound thread entries, determining a message type based on the associated identifier and, based on the message type, determining whether the period since the last transmission time exceeds a threshold, and, if the period since the last transmission exceeds the threshold, deleting the outbound thread entry.

24. The computer executable instructions of claim 17, further operable when executed to perform the steps of:

periodically accessing a database maintaining a plurality of inbound thread entries, each inbound thread entry specifying an associated identifier, indicating an expected sequence indicator, indicating a period since a last received document, and indicating whether an unexpected document has been received; and for each of the inbound thread entries, if an unexpected document has been received and if the period since the last received document exceeds a threshold, raising an exception condition.

25. A device for sequencing document-based communications comprising:

means for receiving a markup language document comprising text-based electronic data for delivery to a destination address;

means for determining a thread identifier associated with the document, the thread identifier indicating that the document is one of potentially multiple related documents;

means for determining a sequence indicator for the document based on the thread identifier;

means for modifying the document to indicate the sequence indicator;

means for storing the thread identifier and associated sequence information in an interface database, the sequence information determined based on the sequence indicator; and means for transmitting the document using a communication network.

* * * * *